2,934,469

PHOSPHINYLVINYL PHOSPHATES

Joseph W. Baker and George A. Saul, Nitro, W. Va., assignors to Monsanto Chemical Company, St. Louis, Mo., a corporation of Delaware No Drawing. Application January 30, 1956
Serial No. 562,000

14 Claims. (Cl. 167—22)

This invention relates to new chemical compounds. More particularly, this invention relates to phosphinylvinyl phosphates and to a method for their preparation. These materials are both vinyl phosphates and vinyl phosphonates This invention has as an object the provision of new compounds and method of preparation. A further object is to provide new compounds which are useful pesticides. Another object is to provide pesticidal compositions containing the new compounds. A still further object is to provide new compositions and methods effective for combatting insects and other pests. Other objects will appear hereinafter.

As determined by infrared spectrometry, the compounds of the present invention have the general formula

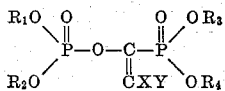

where $R_1$, $R_2$, $R_3$ and $R_4$ represent saturated or unsaturated hydrocarbon radicals or substituted derivatives, as for example methyl, ethyl, propyl, isopropyl, allyl, butyl, isobutyl, amyl, isoamyl, hexyl, methoxyethyl, ethoxyethyl, cyanoethyl, dialkylaminoethyl, chloromethyl, chloroethyl, octyl and heptyl radicals, and X and Y represent hydrogen or halogen.

The phosphinylvinyl phosphates form readily by reacting two moles of an alkyl phosphite of the structure

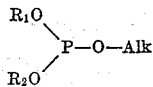

where $R_1$ and $R_2$ have the same significance as before and Alk represents an alkyl group or substituted alkyl group, preferably a lower alkyl group such as methyl or ethyl, with one mole of an alpha-halo fatty acid halide. The halogen may be chlorine, bromine, fluorine or iodine but chlorine is preferred. When two moles of the same alkyl phosphite are mixed with one mole of the alpha-halo fatty acid halide, $R_3$ and $R_4$ are the same as $R_1$ and $R_2$ in the general formula. They may, however, be different. Compounds wherein $R_1$ and $R_2$ differ from $R_3$ and $R_4$ are prepared by reacting equal molecular proportions of haloacid halide and trialkyl phosphite and then reacting the intermediate 1-oxo 2-haloalkyl phosphonate with a different alkyl phosphite. Preparation of the intermediate is described in copending application Serial No. 510,553, filed May 23, 1955. Suitable alpha-halo fatty acid halides comprise chloroacetyl chloride, dichloroacetyl chloride, trichloroacetyl chloride, alpha-chloropropionyl chloride, bromoacetyl chloride, bromoacetyl bromide, chloroacetyl fluoride, fluoroacetyl chloride, iodoacetyl bromide, iodoacetyl fluoride, chloroacetyl iodide and the like. The reaction may be carried out in the absence or presence of an inert solvent and the alpha-halo fatty acid halide may contain a small amount of hydroquinone to prevent polymerization of the product. Among suitable solvents are heptane and toluene.

The following are illustrative of the invention and are not to be taken as limitative thereof.

Example 1

Into a 500 ml. flask equipped with a condenser, stirrer, thermometer and dropping funnel was charged 99.7 grams (0.6 mole) of triethyl phosphite. Through the dropping funnel over a period of 15 minutes was added 33.9 grams (0.3 mole) of chloroacetyl chloride with the temperature being held below 40° C. by external cooling. The reaction mixture was heated at 100° C. for two hours, the last 45 minutes being under reduced pressure. The weight loss from volatilization of ethyl chloride was 37.1 grams (theory=38.7 grams). The 1-(diethoxyphosphinyl)vinyl diethyl phosphate was a water-white material obtained in quantitative yield. Analysis gave 18.7% phosphorus as compared to 19.6% calculated for $C_{10}H_{22}O_7P_2$. It was soluble in ether, acetone, benzene, chloroform, ethyl alcohol and ethyl acetate.

Example 2

To 83.3 grams (0.4 mole) of triisopropyl phosphite was added dropwise with stirring 22.5 grams (0.2 mole) of chloroacetyl chloride. The temperature was held at −10 to 0° C. during the addition which required two hours. The reaction mixture was then agitated at room temperature for one-half hour, after which the temperature was brought to 90° C. during the next half hour. Heating was continued at 90–100° C. for one and one-half hours longer, the last half hour being under reduced pressure. The 1-(diisopropoxyphosphinyl)vinyl diisopropyl phosphate, a colorless liquid, was obtained in essentially quantitative yield. Analysis gave 16.9% phosphorus compared to 16.6% calculated for $C_{14}H_{30}O_7P_2$.

Example 3

In a similar manner, 124.1 grams (1.0 mole) of trimethyl phosphite and 56.4 grams (0.5 mole) of chloroacetyl chloride were reacted together to obtain 1-(dimethoxyphosphinyl)vinyl dimethyl phosphate as a colorless liquid.

Example 4

Substituting tris(2-chloroethyl) phosphite in Example 2, the addition of the chloroacetyl chloride required 45 minutes. The 1-[bis(2-chloroethoxy)phosphinyl]vinyl bis(2-chloroethyl) phosphate, a colorless liquid, was obtained in essentially theoretical yield.

Example 5

To 73.7 grams (0.5 mole) of dichloroacetyl chloride was added with stirring 124.1 grams (1.0 mole) of trimethyl phosphite over a period of 5 hours at a temperature of −10 to 0° C. The mixture was then agitated at room temperature for one-half hour and then heated to 80° C. during the next half hour. The temperature was held at 80–90° C. for one and one-half hours, the last half hour being under reduced pressure. The 2-chloro-1-(dimethoxyphosphinyl)vinyl dimethyl phosphate, a light yellow liquid, was obtained in essentially theoretical yield. Analysis gave 20.7% phosphorus and 13.4% chlorine compared to 21.0% phosphorus and 12.0% chlorine calculated for $C_6H_{13}ClO_7P_2$.

Example 6

Diethyl chloroacetyl phosphonate was prepared from 56.4 grams (0.5 mole) of chloroacetyl chloride and 83.1 grams (0.5 mole) of triethyl phosphite according to the procedure described in application Serial No. 510,553, filed May 23, 1955. To 107 grams of the product so prepared was added 62.1 grams (0.5 mole) of trimethyl phosphite over a period of 3 hours at −10 to 0° C. The reaction was completed as described in Example 5 to yield the theoretical quantity of 1-(diethoxyphosphinyl)-vinyl dimethyl phosphate as a yellow liquid.

*Example 7*

A solution of 36.4 grams (0.2 mole) of trichloroacetyl chloride in 150 cc. of heptane was cooled to −35° C. and 49.6 grams (0.4 mole) of trimethyl phosphite in 75 cc. of heptane added at −15 to −35° C. over a period of one-half hour. The reaction mixture was then allowed to warm to room temperature and finally raised gradually to refluxing temperature and held there for two hours. The solvent was then removed under reduced pressure and the 2,2-dichloro-1-(dimethoxyphosphinyl) vinyl dimethyl phosphate obtained as a light yellow liquid analyzing 20.6% chlorine as compared to 21.5% calculated for $C_6H_{12}Cl_2O_7P_2$.

*Example 8*

To a solution of 29.5 grams (0.2 mole) of dichloroacetyl chloride and 0.3 gram of hydroquinone in 100 cc. of heptane was added 66.5 grams (0.4 mole) of triethyl phosphite in 75 cc. of heptane at −35° to −15° C. over a period of one hour. The product was allowed to warm up to 20° C. over the next half hour, gentle heat then applied and the reaction mixture finally heated at 80–90° C. for one hour. The solvent was removed as above and the 2-chloro-1-(diethoxyphosphinyl)vinyl diethyl phosphate so obtained was a light yellow product analyzing 16.7% phosphorus and 11.1% chlorine compared to 17.6% phosphorus and 10.1% chlorine calculated for $C_{10}H_{21}ClO_7P_2$.

*Example 9*

Substituting trichloroacetyl chloride in Example 8, the phosphite was added at a temperature of −40° to −20° C. over a period of 45 minutes. The 2,2-dichloro-1-(diethoxyphosphinyl)vinyl diethyl phosphate, a light yellow liquid, was obtained in essentially theoretical yield. Analysis gave 17.9% chlorine as compared to 18.4% calculated for $C_{10}H_{20}Cl_2O_7P_2$.

*Example 10*

To a solution of 27.8 grams (0.153 mole) of trichloroacetyl chloride in 125 cc. of heptane was added dropwise 82.5 grams (0.306 mole) of tris(2-chloroethyl) phosphite at −40° to −25° C. over a period of 75 minutes. The product was warmed to room temperature, 0.2 gram of hydroquinone added and finally raised slowly to refluxing temperature and held there for 15 minutes. The solvent was removed initially at atmospheric pressure and finally at 12 mm. The yield of 1 - [bis(2 - chloroethoxy)phosphinyl] - 2,2 - dichlorovinyl bis(2-chloroethyl) phosphate was essentially theoretical. Analysis gave 40.1% chlorine as compared to 40.5% calculated for $C_{10}H_{16}Cl_6O_7P_2$.

*Example 11*

Substituting dichloroacetyl chloride in Example 10, the temperature was held at −45° to −30° C. during the addition which required 90 minutes. The 1 - [bis(2-chloroethoxy)phosphinyl] - 2 - chlorovinyl bis(2 - chloroethyl) phosphate was obtained in theoretical yield. Analysis gave 12.7% phosphorus and 36.3% chlorine as compared to 12.7% phosphorus and 36.3% chlorine calculated for $C_{10}H_{17}Cl_5O_7P_2$.

*Example 12*

To a solution of 49.1 grams (0.33 mole) of dichloroacetyl chloride in 75 cc. of heptane was added 55.4 grams (0.33 mole) of triethyl phosphite in 50 cc. of heptane at −40° to −25° C. over a period of one hour. The mixture was then gradually heated to 60° C. and held there for 15 minutes. Upon cooling, 0.2 gram of hydroquinone was added followed by 41.0 grams (0.33 mole) of trimethyl phosphite in 50 cc. of heptane, the temperature being held at −40° to −25° C. during the addition. Thereupon, the mixture was gradually heated to refluxing temperature and held there for 15 minutes. The initial portion of the solvent was removed under atmospheric pressure followed by vacuum stripping to give a theoretical yield of 2-chloro-1-(diethoxyphosphinyl)vinyl dimethyl phosphate. Analysis gave 19.5% phosphorus and 11.6% chlorine as compared to 19.2% phosphorus and 11.0% chlorine calculated for $$C_8H_{17}ClO_7P_2$$

*Example 13*

In this example, trichloroacetyl chloride was substituted for dichloroacetyl chloride in Example 12. The 2,2-dichloro-1-(diethoxyphosphinyl)vinyl dimethyl phosphate was a light yellow product analyzing 16.4% phosphorus and 19.4% chlorine as compared to 17.3% phosphorus and 19.8% chlorine calculated for $C_8H_{16}Cl_2O_7P_2$.

*Example 14*

To a solution of 24.5 grams (0.167 mole) of dichloroacetyl chloride in 75 cc. of heptane was added dropwise 20.7 grams (0.167 mole) of trimethyl phosphite in 50 cc. of heptane at −45° to −30° C. over a period of one hour. The product was then gradually heated to 60° C., cooled, 0.2 gram of hydroquinone added followed by the addition of 27.7 grams (0.167 mole) of triethyl phosphite in 50 cc. of heptane. The temperature was held at −45° to −30° C. during the addition which required an hour. The product was gradually heated to refluxing temperature and held there for 15 minutes. The solvent was removed initially under atmospheric pressure and finally under reduced pressure. Essentially a theoretical yield of 2-chloro-1-(dimethoxyphosphinyl)vinyl diethyl phosphate was obtained analyzing 19.9% phosphorus and 11.2% chlorine as compared to 19.2% phosphorus and 11.0% chlorine calculated for $C_8H_{17}ClO_7P_2$.

*Example 15*

Substituting trichloroacetyl chloride in Example 14, 2,2-dichloro-1-(dimethoxyphosphinyl)vinyl diethyl phosphate was obtained in essentially theoretical yield.

*Example 16*

In this example chloroacetyl chloride was substituted for the dichloroacetyl chloride in Example 14. Theoretical yield of diethyl 1 - (dimethoxyphosphinyl)vinyl phosphate was obtained. Analysis of the product gave 21.6% phosphorus as compared to 21.4% calculated for $C_8H_{18}O_7P_2$.

The phosphinylvinyl phosphates of this invention are effective insecticides. Among other ways this was demonstrated by spraying Petri dishes with an acetone solution of the test material using approximately 20 cc. for each spraying. The open dishes were held for 24 hours, then milkweed bugs were placed on the dishes and held uncovered for 48 hours at room temperature without food or water and the percent kill determined. At 0.1% concentration of 1-(diethoxyphosphinyl)vinyl diethyl phosphate, the percent kill was 100. Continued testing led to the conclusion that 1-(dimethoxyphosphinyl)vinyl dimethyl phosphate, 1-(diethoxyphosphinyl) vinyl dimethyl phosphate and 2,2-dichloro-1-(dimethoxyphosphinyl)vinyl dimethyl phosphate were even more active insecticides. They possessed a high degree of contact, residual and systemic activity. Significantly, the toxicity of the more efficient insecticides to warm blooded animals is less than that of some of the important commercial phosphorus insecticides. The oral $LD_{50}$ to rats of 1-(dimethoxyphosphinyl)vinyl dimethyl phosphate is 287 mg./kg.

Some of the compounds are toxic to nematodes. For example, the product of Example 4 was especially effective. For this use the active compound, diluted or undiluted, may be applied to the soil at rates of 50 to 500 pounds per acre. The preferred application for treating soils of average nematode infection will be from 25 to 100 pounds per acre.

The new compounds are useful for destroying a variety of pests by contacting the pest in its environment including foliage, soil, barnyards, chicken pens, stables and other infected areas. Pests controlled in addition to those mentioned comprise yellow fever mosquito larvae, 2-spotted spider mite, red flour beetle adults, southern armyworm larvae and cotton aphid adults. In actual usage the compounds may be applied in solution, as an emulsion, water dispersion or in a solid formulation wherein the active ingredient is distributed over a dry, permanently free-flowing powder as for example clays, including bentonite and attapulgite or such materials as talc, diatomaceous earth, Fuller's earth, chalk or calcium carbonate. These diluents possess the added advantage of lower cost treatment since normally they comprise more than 50% up to 98% of the complete formulation, thereby providing a means of more even distribution of the active material over a wider area, and in the effective quantities required. The amounts required are small because of the effectiveness of the new compounds. Sprays for application to agricultural crops may suitably be applied at a concentration of 0.005 to 1.0%.

It is intended to cover all changes and modifications of the examples of the invention herein chosen for purposes of disclosure which do not constitute departure from the spirit and scope of the invention.

What is claimed is:

1. A compound of the formula

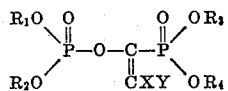

where $R_1$, $R_2$, $R_3$ and $R_4$ are members of the group consisting of alkyl of 1-8 carbon atoms, allyl, lower alkoxyethyl, cyanoethyl and chlorosubstituted lower alkyl and X and Y each represents a member of the group consisting of hydrogen and halogen.

2. A compound of the formula

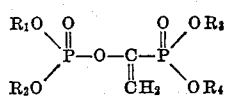

where $R_1$, $R_2$, $R_3$ and $R_4$ are lower alkyl groups.

3. A compound of the formula

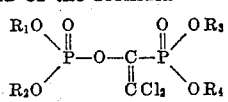

where $R_1$, $R_2$, $R_3$ and $R_4$ are lower alkyl groups.

4. A compound of the formula

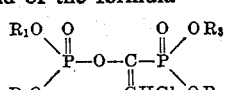

where $R_1$, $R_2$, $R_3$ and $R_4$ are lower alkyl groups.

5. The compound of the structure

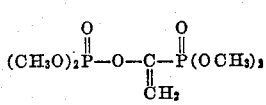

6. The compound of the structure

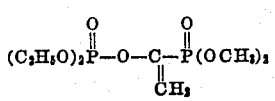

7. The compound of the structure

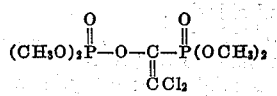

8. The compound of the structure

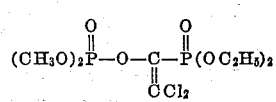

9. The compound of the structure

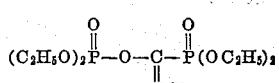

10. A process for the manufacture of a compound of the structure

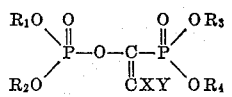

where $R_1$, $R_2$, $R_3$ and $R_4$ are members of the group consisting of alkyl of 1-8 carbon atoms, allyl, lower alkoxyethyl, cyanoethyl and chlorosubstituted lower alkyl and X and Y each represents a member of the group consisting of hydrogen and halogen, which comprises reacting one mole of an alpha-halo fatty acid halide and two moles of

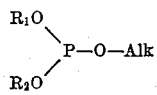

where $R_1$ and $R_2$ have the same significance as before and Alk has the same significance as $R_1$ and $R_2$.

11. A process for the manufacture of a compound of the structure

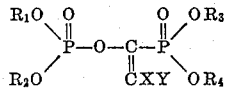

where $R_1$, $R_2$, $R_3$ and $R_4$ represent lower alkyl radicals and X and Y each represents a member of the group consisting of hydrogen and halogen, which comprises reacting one mole of a 1-oxo 2-haloalkyl phosphonate with one mole of

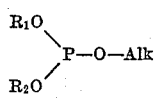

where $R_1$ and $R_2$ have the same significance as before and Alk has the same significance as $R_1$ and $R_2$.

12. An insecticidal composition consisting essentially of a major proportion of an inert carrier and a minor but effective proportion as an essential active component of a compound of the formula

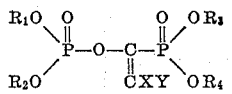

where $R_1$, $R_2$, $R_3$ and $R_4$ represent lower alkyl and X and Y each represents a member of the group consisting of hydrogen and chlorine.

13. A method of combatting insects which comprises applying to the locus to be protected a composition containing, as an essential active component thereof, a compound of the formula

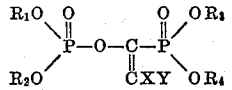

where $R_1$, $R_2$, $R_3$ and $R_4$ represent lower alkyl and X and Y each represents a member of the group consisting of hydrogen and chlorine.

14. A method of combatting insects which comprises applying to the plant to be protected a composition containing, as an essential active component thereof, a compound of the formula

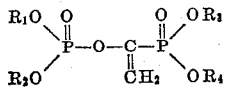

where $R_1$, $R_2$, $R_3$ and $R_4$ are alkyl radicals containing less than 3 carbon atoms.

References Cited in the file of this patent

UNITED STATES PATENTS

| | | |
|---|---|---|
| 2,491,920 | Ernsberger | Dec. 20, 1949 |
| 2,559,854 | Coover et al. | July 10, 1951 |
| 2,719,167 | Schmidt | Sept. 27, 1955 |

FOREIGN PATENTS

| | | |
|---|---|---|
| 303,952 | Switzerland | Mar. 1, 1955 |

OTHER REFERENCES

Pudovik: "Doklady Akad. Nauk S.S.S.R." 105, 735–7 (1955) (in Russian).